US012800794B2

(12) United States Patent
Fujiwara

(10) Patent No.: US 12,800,794 B2
(45) Date of Patent: Nov. 17, 2026

(54) LENS AND LENS DEVICE

(71) Applicant: FUJIFILM Corporation, Tokyo (JP)

(72) Inventor: Masanori Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 647 days.

(21) Appl. No.: 18/344,858

(22) Filed: Jun. 30, 2023

(65) Prior Publication Data

US 2024/0036234 A1 Feb. 1, 2024

(30) Foreign Application Priority Data

Jul. 29, 2022 (JP) ................................ 2022-121580

(51) Int. Cl.
*G02B 1/11* (2015.01)
*G02B 1/04* (2006.01)

(52) U.S. Cl.
CPC ................ *G02B 1/11* (2013.01); *G02B 1/041* (2013.01)

(58) Field of Classification Search
CPC ........... G02B 1/11; G02B 1/041; G02B 1/111; G02B 1/115; G02B 3/00; G02B 5/18; G02B 5/208; G02B 1/04; G02B 7/02
See application file for complete search history.

(56) References Cited

U.S. PATENT DOCUMENTS

| | | | | |
|---|---|---|---|---|
| 7,901,787 B2 | | 3/2011 | Miyakawa | |
| 10,921,501 B2 | | 2/2021 | Miyasaka | |
| 2013/0064057 A1* | | 3/2013 | Yamasaki ............ | G11B 7/1275 359/581 |
| 2013/0077156 A1* | | 3/2013 | Karasawa ............. | G02B 5/305 156/182 |
| 2013/0216807 A1* | | 8/2013 | Wakefield ............. | G02B 1/113 428/218 |
| 2021/0208476 A1 | | 7/2021 | Shimotsu | |

FOREIGN PATENT DOCUMENTS

| | | |
|---|---|---|
| JP | 2000266907 | 9/2000 |
| JP | 2008203580 | 9/2008 |
| JP | 2010139532 | 6/2010 |
| JP | 2020109956 | 7/2020 |
| JP | 6955307 | 10/2021 |
| WO | 2009038134 | 3/2009 |
| WO | 2011161879 | 12/2011 |
| WO | 2016117452 | 7/2016 |

OTHER PUBLICATIONS

"Notice of Reasons for Refusal of Japan Counterpart Application", issued on Mar. 31, 2026, with English translation thereof, p. 1-p. 7.

* cited by examiner

*Primary Examiner* — Balram T Parbadia
(74) *Attorney, Agent, or Firm* — JCIPRNET

(57) ABSTRACT

A lens includes: an optical layer containing a resin; a member; and an antireflection layer, the antireflection layer is provided at an outermost surface, in an optical axis direction, of the lens, and a transmittance of the antireflection layer has a maximal value and a minimal value in order from a short wavelength side of a wavelength of light.

25 Claims, 5 Drawing Sheets

FIG. 6

| | FIRST ANTIREFLECTION LAYER | | | SECOND ANTIREFLECTION LAYER | | | OPTICAL LAYER | | EVALUATION ITEM | | |
|---|---|---|---|---|---|---|---|---|---|---|---|
| | COATING CONFIGURATION | TRANSMITTANCE MAXIMAL VALUE @350 TO 450 nm | TRANSMITTANCE MINIMAL VALUE @450 TO 650 nm | COATING CONFIGURATION | TRANSMITTANCE MAXIMAL VALUE @350 TO 450 nm | TRANSMITTANCE MINIMAL VALUE @450 TO 650 nm | ORGANIC COLORING AGENT | TRANSMITTANCE MINIMAL VALUE | PRODUCTION SUITABILITY | AVERAGE TRANSMITTANCE OF ENTIRE LENS IN SECOND WAVELENGTH BAND | LOWER LIMIT VALUE OF AVERAGE DIFFRACTION EFFICIENCY OF OPTICAL LAYER IN SECOND WAVELENGTH BAND |
| EXAMPLE 1 | COATING A2 | 90% | 47% | COATING A1 | 99% | 31% | CONTAINED | 594 nm | A | 43%(A) | 90%(A) |
| EXAMPLE 2 | COATING A2 | 90% | 47% | COATING A3 | 95% | 36% | CONTAINED | 594 nm | A | 43%(A) | 90%(A) |
| EXAMPLE 3 | COATING A1 | 99% | 31% | COATING A1 | 99% | 31% | CONTAINED | 594 nm | A | 43%(A) | 90%(A) |
| COMPARATIVE EXAMPLE 1 | COATING A4 | 62% | 30% | COATING A1 | 99% | 31% | CONTAINED | 594 nm | B | 45%(A) | 90%(A) |
| COMPARATIVE EXAMPLE 2 | COATING A2 | 90% | 47% | COATING A5 | 56% | 25% | CONTAINED | 594 nm | B | 45%(A) | 90%(A) |
| COMPARATIVE EXAMPLE 3 | COATING A6 | 91% | 87% | COATING A6 | 91% | 87% | CONTAINED | 594 nm | A | 24.4%(B) | 90%(A) |
| REFERENCE EXAMPLE | COATING A2 | 90% | 47% | COATING A1 | 99% | 31% | NOT CONTAINED | - | A | 51%(A) | 70%(B) |

LENS AND LENS DEVICE

CROSS-REFERENCE TO RELATED APPLICATIONS

The present application claims priority under 35 U.S.C. § 119 to Japanese Patent Application No. 2022-121580, filed on Jul. 29, 2022. The above application is hereby expressly incorporated by reference, in its entirety, into the present application.

BACKGROUND OF THE INVENTION

1. Field of the Invention

The present invention relates to a lens and a lens device.

2. Description of the Related Art

WO2009/038134A describes a resin composite optical element that cuts ultraviolet rays.

WO2016/117452A describes an optical member comprising a reflection-scattering portion that reflects and scatters light in at least a part of a visible wavelength range and that transmits light in at least a part of an infrared wavelength range, in which a rectilinear transmittance with respect to the light in at least a part of the infrared wavelength range is 75% or more.

JP2010-139532A describes a composite optical element including a glass substrate and a photocurable resin layer having an optical shape portion and laminated on the glass substrate, in which the glass substrate includes a band reflection filter that reflects light having a wavelength range of 270 to 410 nm and that transmits light outside the range.

JP2000-266907A describes a resin-bonded optical element formed of a cured resin layer provided on a substrate, in which the cured resin layer is provided on one surface of the substrate, and an antireflection film with a reflectivity of 1% or less with respect to light having a wavelength of 365 nm is provided on the other surface of the substrate.

JP6955307B describes an imaging lens including a plurality of lenses, in which at least a part of the plurality of lenses is coated, in a near-infrared wavelength region, a light transmittance on a short wavelength side with respect to a near-infrared peak wavelength region including 1550 nm decreases as a wavelength becomes shorter from a short wavelength end of the near-infrared peak wavelength region to at least 1350 nm, and a light transmittance on a long wavelength side with respect to the near-infrared peak wavelength region decreases as a wavelength becomes longer from a long wavelength end of the near-infrared peak wavelength region to at least 1750 nm.

SUMMARY OF THE INVENTION

The technology of the present disclosure is shown below.

(1)

A lens comprising:

an optical layer containing a resin;

a member; and an antireflection layer, in which the antireflection layer is provided at an outermost surface, in an optical axis direction, of the lens, and a transmittance of the antireflection layer has a maximal value and a minimal value in order from a short wavelength side of a wavelength of light.

(2)

The lens according to (1), in which a difference between the maximal value and the minimal value is 35% or more.

(3)

The lens according to (1) or (2), in which the maximal value is equal to or more than 1.3 times the minimal value.

(4)

The lens according to any one of (1) to (3), in which a wavelength band of light is defined as a first wavelength band, a second wavelength band that does not overlap with the first wavelength band, and a third wavelength band between the first wavelength band and the second wavelength band, and the transmittance of the antireflection layer has the minimal value in the third wavelength band and has the maximal value in the first wavelength band.

(5)

The lens according to (4), in which a difference between the maximal value and the minimal value is 35% or more.

(6)

The lens according to (4) or (5), in which the first wavelength band partially overlaps with an ultraviolet region.

(7)

The lens according to any one of (4) to (6), in which the transmittance of the antireflection layer has a peak value in the second wavelength band.

(8)

The lens according to any one of (4) to (6), in which a maximum transmittance of the antireflection layer in the first wavelength band has a value higher than a first threshold value.

(9)

The lens according to any one of (4) to (8), in which a transmittance of the optical layer has a minimal value in the third wavelength band.

(10)

The lens according to (9), in which a maximum transmittance of the optical layer in terms of a thickness of 10 μm in the first wavelength band has a value higher than a second threshold value.

(11)

The lens according to (9) or (10), in which the transmittance of the optical layer has a maximal value at a wavelength in the third wavelength band which is nearer to the first wavelength band than a wavelength at which the transmittance of the optical layer has the minimal value is.

(12)

The lens according to (11), in which the transmittance of the optical layer has a peak value in the second wavelength band.

(13)

The lens according to any one of (4) to (12), in which the second wavelength band is on a long wavelength side with respect to the first wavelength band.

(14)

The lens according to any one of (4) to (13), in which the first wavelength band is a photosensitive wavelength band of a photopolymerization initiator contained in the resin of the optical layer.

(15)

The lens according to any one of (4) to (14), in which the second wavelength band is a wavelength band in which an average transmittance of the optical layer in terms of a thickness of 10 μm is higher than a third threshold value, an average value of slopes of tangent lines of a graph showing wavelength dependence of the transmittance of the optical layer is within a range from a first slope threshold value to a second slope threshold value, and an average transmittance of the antireflection layer is higher than a fourth threshold value.

(16)

The lens according to any one of (4) to (15), in which the third wavelength band is a wavelength band between a value on a long wavelength side by 50 nm with respect to a minimal value of a transmittance of the optical layer and a value on the short wavelength side by 150 nm with respect to the minimal value of the transmittance of the optical layer.

(17)

The lens according to any one of (4) to (16), in which the minimal value of the transmittance of the antireflection layer is on the short wavelength side with respect to a minimal value of a transmittance of the optical layer in terms of a thickness of 10 μm.

(18)

The lens according to (17), in which a difference between the minimal value of the transmittance of the antireflection layer and the minimal value of the transmittance of the optical layer in terms of a thickness of 10 μm is 50 nm or more and 150 nm or less.

(19)

The lens according to any one of (4) to (18), in which the first wavelength band, the second wavelength band, and the third wavelength band are included in a range of 350 nm or more.

(20)

The lens according to any one of (4) to (19), in which the first wavelength band is in a range of 350 nm or more and less than 450 nm.

(21)

The lens according to any one of (4) to (19), in which the third wavelength band is in a range of 450 nm or more and less than 650 nm.

(22)

The lens according to any one of (4) to (19), in which the second wavelength band is in a range of 650 nm or more and less than 1650 nm.

(23)

The lens according to any one of (1) to (22), in which a diffraction grating is formed on the optical layer.

(24)

The lens according to any one of (1) to (23), in which the member includes a first member and a second member, and the optical layer includes a first layer and a second layer.

(25)

The lens according to (24), in which the first member, the first layer, the second layer, and the second member are laminated in this order, and the antireflection layers are provided on the first member on a side opposite to the first layer and on the second member on a side opposite to the second layer.

(26)

The lens according to (24) or (25), in which a diffraction grating is formed at an interface between the first layer and the second layer.

(27)

A lens comprising:

an optical layer containing a resin;

a member; and an antireflection layer, in which the antireflection layer is provided at an outermost surface, in an optical axis direction, of the lens, a minimal value of a transmittance of the antireflection layer is on a short wavelength side with respect to a minimal value of a transmittance of the optical layer, and a difference between the minimal value of the transmittance of the antireflection layer and the minimal value of the optical layer is 50 nm or more and 150 nm or less.

(28)

A lens comprising:

an optical layer containing a resin;

a member; and an antireflection layer, in which the antireflection layer is provided at an outermost surface, in an optical axis direction, of the lens, a transmittance of the lens has a first maximal value on a short wavelength side, the transmittance of the lens has a second maximal value on a long wavelength side, the transmittance of the lens has a minimal value between the first maximal value and the second maximal value, and in a graph showing wavelength dependence of a transmittance of light, an average value of absolute values of slopes of tangent lines of the graph on the long wavelength side with respect to a wavelength at which the second maximal value is obtained is smaller than an average value of absolute values of slopes of tangent lines of the graph from the second maximal value to the minimal value.

(29)

The lens according to (28), in which a difference between the first maximal value and the minimal value is 20% or more.

(30)

A lens device comprising:

the lens according to any one of (1) to (29).

BRIEF DESCRIPTION OF THE DRAWINGS

FIG. 6 is a diagram showing evaluation results of Examples, Reference Example, and Comparative Examples.

DESCRIPTION OF THE PREFERRED EMBODIMENTS

Figure 1:
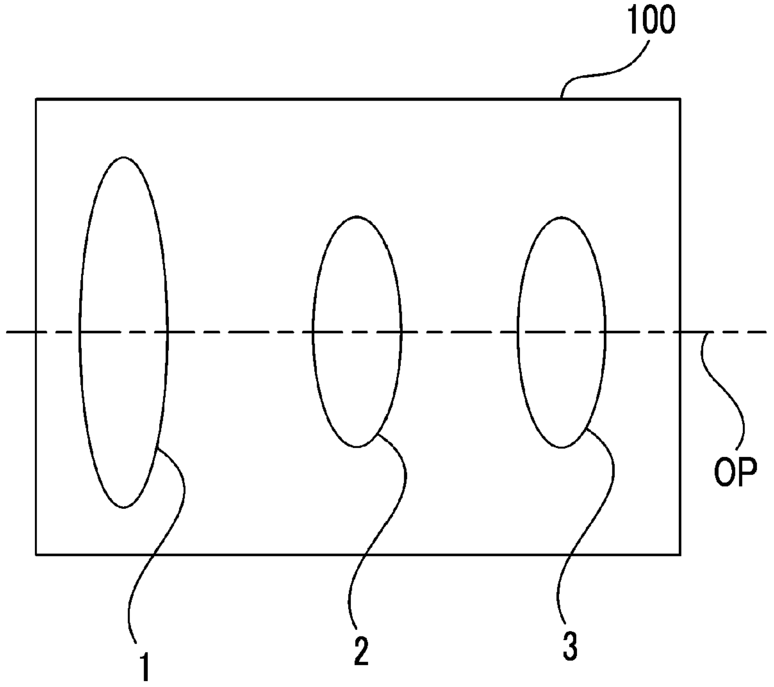
FIG. 1 is a schematic diagram showing a configuration of a lens device 100, which is an embodiment of a lens device of the present invention.

As exemplified in JP6955307B, a lens that enables imaging in a wide wavelength region is known. The lens may be provided with an antireflection layer typified by an antireflection coating (AR coating) in order to prevent reflection of light at an interface with an air layer. In order to realize a lens capable of sufficiently transmitting light in a wide wavelength region, it is necessary to increase the transmittance of light in the antireflection layer in a wide wavelength region. The transmittance of light of a specific member in the present specification means a ratio of the intensity of light emitted from the member to the intensity of light incident on the member in a case where light having a certain wavelength is made incident on the member.

In addition, the lens may include an optical layer containing a resin. This optical layer is generally formed by molding a resin material and curing the resin material with light. In the lens including such an optical layer, in particular, in a case where the wavelength band of light necessary to cure the resin material of the optical layer and the wavelength band of light required for the lens to perform imaging are different from each other and these wavelength bands are largely separated from each other, it is required to form an antireflection layer having an increased transmittance in a wide wavelength band in which these two wavelength bands are combined. However, it is not easy to form the antireflection layer to increase the transmittance in a wide wavelength band.

Further, in the lens including the above optical layer, it is required for the optical layer itself to transmit a large amount of light in the wavelength band necessary to cure the resin material. Therefore, in particular, in a case where the above two wavelength bands are different from each other, it is required for the optical layer to increase the transmittance in a wide wavelength band in which the above two wavelength bands are combined. However, in an attempt to increase the average transmittance for light in a wide wavelength band in the optical layer, it becomes difficult to increase the optical performance. On the other hand, in an attempt to ensure sufficient optical performance in the optical layer, it becomes difficult to increase the average transmittance for light in a wide wavelength band. As described above, in the optical layer, the optical performance and the transmittance have a trade-off relationship. The optical layer may include, for example, a diffraction grating, and the optical performance in such a case is diffraction efficiency.

As a result of the verification, the inventor has found that, in a lens that includes the optical layer and the antireflection layer provided at an outermost surface in an optical axis direction, by setting the transmittance characteristic (a relationship of the transmittance for each wavelength of light) of the antireflection layer to a first transmittance characteristic, it is possible to easily realize a lens capable of imaging with light in a wide wavelength band on a long wavelength side (for example, a wavelength band in a range of 650 nm or more and 1650 nm or less).

The first transmittance characteristic has a maximal value of the transmittance and a minimal value of the transmittance in order from a short wavelength side of the wavelength of light. The maximal value and the minimal value referred to here do not simply refer to the inflection points of a graph showing the transmittance characteristic, but rather to the inflection points with a difference between the two of 35% or more. According to the first transmittance characteristic, the transmittance of the antireflection layer can be individually designed in a first range on the short wavelength side and a second range on the long wavelength side with the minimal value as a boundary. Therefore, it is possible to easily increase the transmittance of the antireflection layer in each individual range as compared with a case where the transmittance of the antireflection layer is increased in a wide wavelength band in which these two ranges are combined. For example, in an attempt to increase the transmittance of the antireflection layer to a certain level or higher in a wide wavelength band, the design of the antireflection layer becomes complicated, and there is a probability that a desired transmittance cannot be realized in some cases. On the other hand, since the transmittance can be individually designed in the above first range and the above second range, the design of the antireflection layer can be simplified, and a desired transmittance can be realized. For example, by employing a configuration in which a wavelength band of light necessary to cure the resin material of the optical layer is included in the above first range and a wavelength band of light necessary to perform imaging is included in the above second range, a lens that enables stable short-time curing of the resin material of the optical layer and allows for high-sensitivity imaging can be formed.

In addition, as a result of the verification, the inventor has found that, in the lens that includes the optical layer and the antireflection layer provided on the outermost surface in the optical axis direction, by setting the transmittance characteristic of the optical layer to a second transmittance characteristic, it is possible to easily realize a lens capable of high-sensitivity imaging with light in a wide wavelength band on the long wavelength side (for example, a wavelength band in a range of 650 nm or more and 1650 nm or less).

The second transmittance characteristic has a maximal value of the transmittance and a minimal value of the transmittance in order from a short wavelength side of the wavelength of light. According to the second transmittance characteristic, the transmittance and the diffraction efficiency of the optical layer can be individually designed in a third range on the short wavelength side and a fourth range on the long wavelength side with the minimal value as a boundary. Therefore, it is possible to easily increase the transmittance and the optical performance of the optical layer in each individual range as compared with a case where the design of the optical layer is performed in a wide wavelength band in which these two ranges are combined. For example, by employing a configuration in which a wavelength band of light necessary to cure the resin material of the optical layer is included in the above third range and a wavelength band of light necessary to perform imaging is included in the above fourth range, a lens that enables stable short-time formation of the optical layer and allows for high-sensitivity imaging can be formed.

Hereinafter, details will be described using an embodiment of the lens device of the embodiment of the present invention as an example.

FIG. 1 is a schematic diagram showing a configuration of the lens device 100 which is an embodiment of the lens device of the present invention. The lens device 100 comprises an optical system 1, an optical system 2, and an optical system 3 arranged in order from a subject side along an optical axis OP. In the example of FIG. 1, the lens device 100 comprises three optical systems, but the lens device 100 need only comprise at least one optical system.

Each of the optical system 1, the optical system 2, and the optical system 3 includes at least one optical element such as a lens, a stop, an optical filter, a half mirror, or a deflecting element. The lens is an objective lens, a zoom lens, a focus lens, or the like. In the present embodiment, the optical system 1 includes at least one lens.

Figure 2:
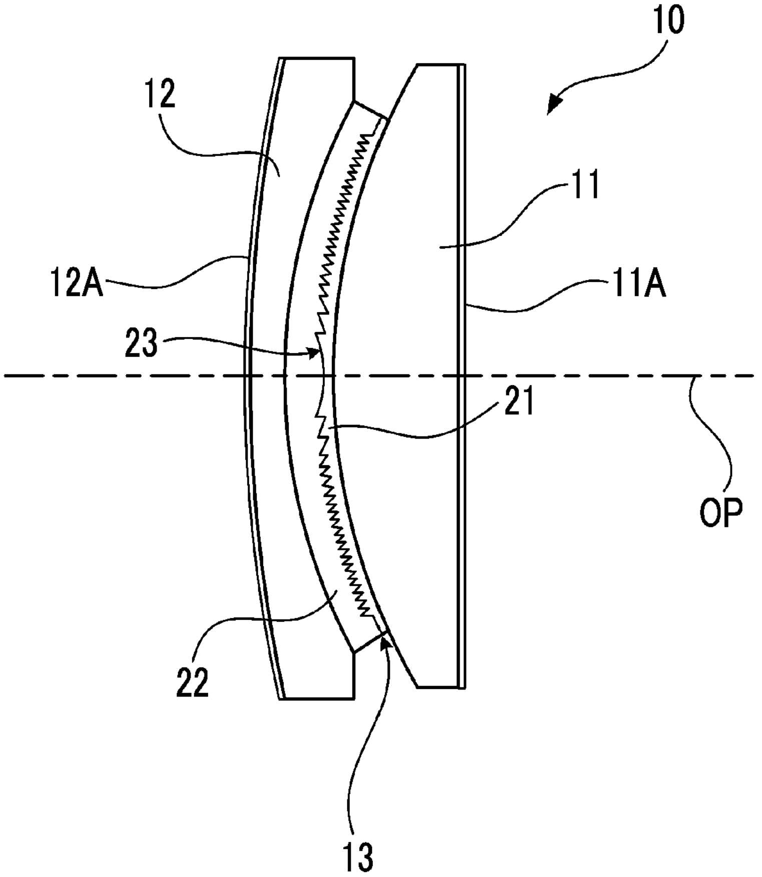
FIG. 2 is a schematic view of a cross-section passing through an optical axis OP of a lens 10 included in an optical system 1.

FIG. 2 is a schematic view of a cross-section passing through the optical axis OP of the lens 10 included in the optical system 1. Hereinafter, a direction in which the optical axis OP extends is referred to as an optical axis direction.

The lens 10 is, for example, an objective lens that is disposed closest to the subject side in the lens device 100. The lens 10 comprises a first member 11 having a convex lens shape, an optical layer 13 including a first layer 21 laminated on a surface of the first member 11 on one side (subject side) in the optical axis direction and a second layer 22 laminated on the first layer 21, a second member 12 having a concave lens shape and laminated on the second layer 22, a first antireflection layer 11A formed on a surface of the first member 11 on the other side in the optical axis direction, and a second antireflection layer 12A formed on a surface of the second member 12 on the subject side in the optical axis direction.

Each of the first member 11 and the second member 12 is made of a glass, a resin, or the like. Each of the first member 11 and the second member 12 can have any shape such as a concave lens shape or a convex lens shape depending on optical characteristics, applications, or the like necessary for the lens 10. The transmittance characteristic of each of the first member 11 and the second member 12 is not particularly limited, but it is preferable that, for example, the transmittance in terms of 10 μm for light in a range of wavelength of 300 nm or less is equal to or less than a threshold value TH1 (for example, 5%) in order to protect the optical layer 13, the optical system disposed in the rear stage, and the like from ultraviolet rays. A member is composed of the first member 11 and the second member 12.

The first layer 21 and the second layer 22 are each a layer containing a resin. The first layer 21 and the second layer 22 may each contain metal or metal oxide particles, or an organic coloring agent in order to control the refractive index. The first layer 21 has a plurality of structures having protrusion shapes on the surface on a second layer 22 side. The first layer 21 and the second layer 22 have different refractive indices, and a diffraction grating is formed by an interface between the second layer 22 and the structures formed on the first layer 21.

The lens 10 is manufactured by preparing the first member 11 in which the first layer 21 is formed on the surface thereof using a mold or the like and a second member 12 in which a resin is applied on the surface thereof, by bonding the first layer 21 side of the first member 11 and a resin side of the second member 12 to each other, and by curing the resin applied to the second member 12. The first layer 21 can be formed, for example, by a method of creating a mold of the shape thereof through cutting or the like and transferring the shape to a resin by a molding process such as ultraviolet curing, thermal curing, or injection molding. In a case where the first layer 21 is cured by ultraviolet rays, as the resin contained in the first layer 21, a resin that contains a photopolymerization initiator and is cured by light irradiation is used. In this case, as the resin contained in the first layer 21, a resin that is cured by light having a wavelength in a range of 350 nm or more and less than 450 nm is preferably used. In other words, the photosensitive wavelength band of the photopolymerization initiator contained in the resin of the first layer 21 is preferably in a range of 350 nm or more and less than 450 nm.

As the resin contained in the second layer 22, a resin that contains a photopolymerization initiator and is cured by light irradiation is used. As the resin contained in the second layer 22, a resin that is cured by light having a wavelength in a range of 350 nm or more and less than 450 nm is preferably used. In other words, the photosensitive wavelength band of the photopolymerization initiator contained in the resin of the second layer 22 is preferably in a range of 350 nm or more and less than 450 nm.

The first antireflection layer 11A and the second antireflection layer 12A are provided on the outermost surfaces of the lens 10 in the optical axis direction. The first antireflection layer 11A and the second antireflection layer 12A are each formed by a coating obtained by laminating a material that transmits light, such as $TiO_2$, $Ta_2O_5$, $Al_2O_3$, $SiO_2$, and $MgF_2$, in a thin film shape on the surface on which it is formed. In each of the first antireflection layer 11A and the second antireflection layer 12A, by adjusting the refractive index, the thickness, and the number of layers of the material forming the thin film, the transmittance in a specific wavelength region can be increased, and the transmittance in another wavelength region different from the specific wavelength region can be decreased. The coating material, the coating thickness, and the number of coating layers for increasing the transmittance in the specific wavelength region and decreasing the transmittance in the other wavelength region can be designed by computer simulation or the like. The first antireflection layer 11A and the second antireflection layer 12A constitute an antireflection layer, and hereinafter, these are collectively referred to as an antireflection layer.

Figure 3:
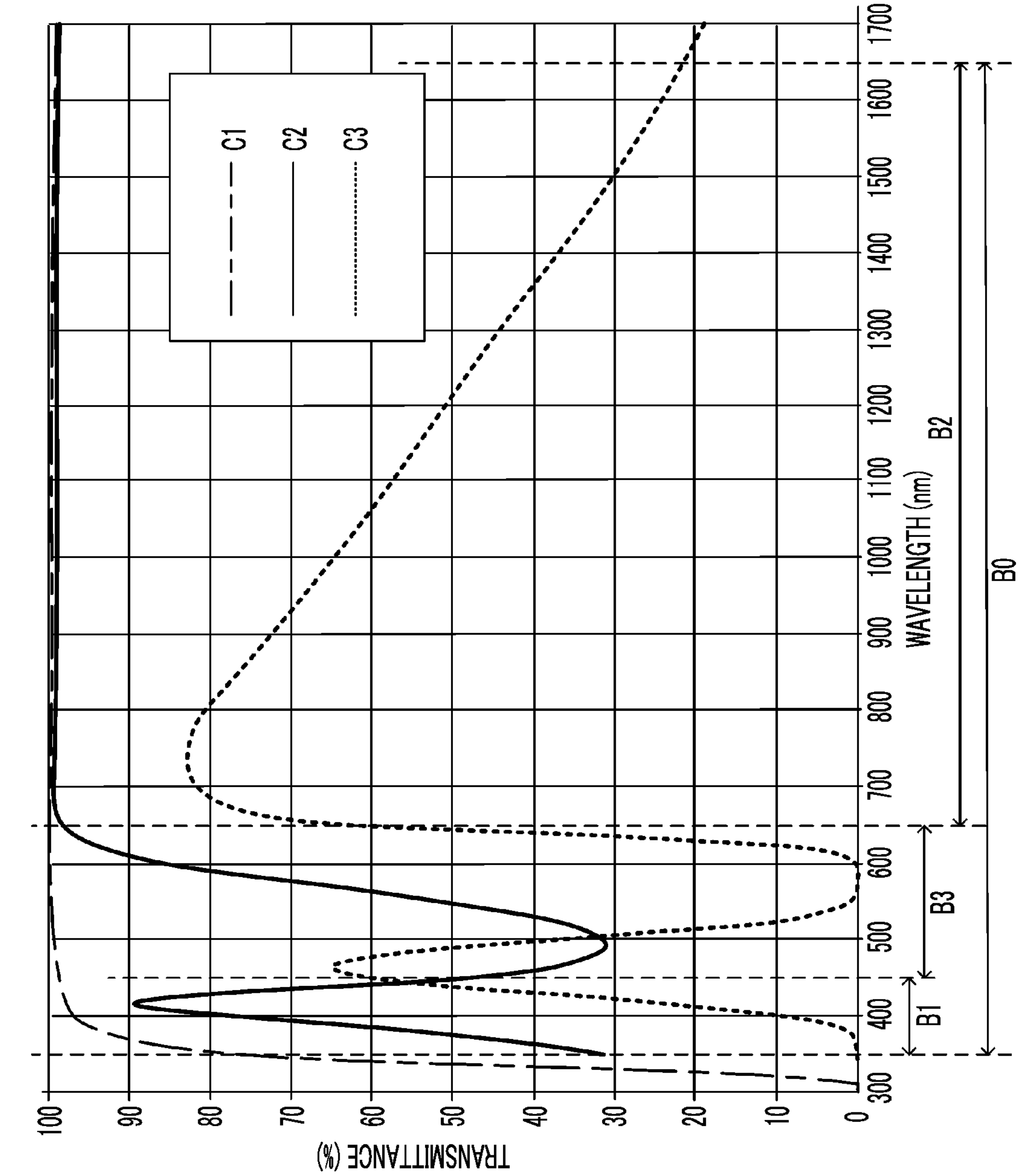
FIG. 3 is a diagram showing a preferable example of a transmittance characteristic of each constituent element of the lens 10.

FIG. 3 is a diagram showing a preferable example of the transmittance characteristic of each constituent element of the lens 10. A transmittance characteristic C1 shown in FIG. 3 indicates a preferable transmittance characteristic of each of the first member 11 and the second member 12 of the lens 10. A transmittance characteristic C2 shown in FIG. 3 indicates a preferable transmittance characteristic of each of the first antireflection layer 11A and the second antireflection layer 12A. The transmittance characteristic C2 is one of specific examples of the above-described first transmittance characteristic. A transmittance characteristic C3 shown in FIG. 3 indicates a preferable transmittance characteristic of the first layer 21. The transmittance characteristic C3 is one of specific examples of the above-described second transmittance characteristic. The transmittance of the transmittance characteristic C3 shown in FIG. 3 shows a value in a case where the average thickness of the first layer 21 in the optical axis direction is converted into 10 μm.

Figure 4:
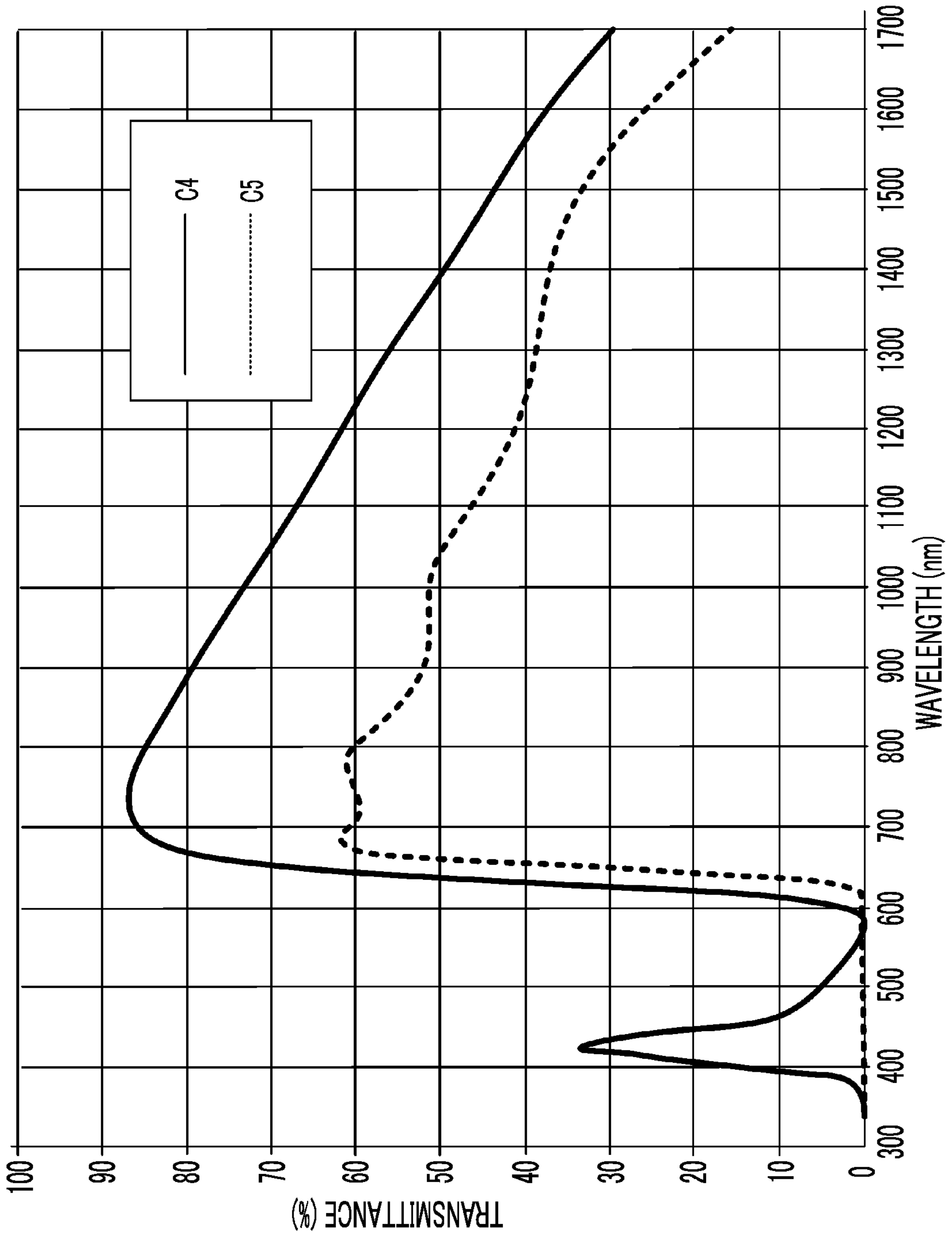
FIG. 4 is a diagram showing a transmittance characteristic of the lens 10 composed of each constituent element having the transmittance characteristic shown in FIG. 3 and a transmittance characteristic of the lens device 100 including the lens 10.

FIG. 4 is a diagram showing the transmittance characteristic of the lens 10 composed of each constituent element having the transmittance characteristic shown in FIG. 3 and the transmittance characteristic of the lens device 100 including the lens 10. A transmittance characteristic C4 shown in FIG. 4 indicates the transmittance characteristic of the lens 10. A transmittance characteristic C5 shown in FIG. 4 indicates the transmittance characteristic of the lens device 100. The transmittance characteristic C2, the transmittance characteristic C3, the transmittance characteristic C4, and the transmittance characteristic C5 each indicate the transmittance in a range of a wavelength of 350 nm or more and 1700 nm or less. The transmittance of each of the transmittance characteristic C4 and the transmittance characteristic C5 shown in FIG. 4 show a value in a case where the average thickness of the optical layer 13 in the optical axis direction is converted into 10 μm. The transmittance characteristics C1 to C5 each constitute a graph showing the wavelength dependence of the transmittance.

FIG. 3 shows an example in a case where the photosensitive wavelength band (hereinafter, referred to as a first wavelength band B1) of the resin contained in the second layer 22 of the optical layer 13 is set as a range of 350 nm or more and less than 450 nm, which partially overlaps with the ultraviolet region (in a range of a wavelength of 380 nm or less), and the entire lens 10 is designed such that the average transmittance in a range of a wavelength of 650 nm or more and 1650 nm or less (hereinafter, referred to as a second wavelength band B2) is sufficiently high (specifically, 30% or more).

The second wavelength band B2 is a wavelength band used in a case of performing imaging through the lens device 100 and is a wavelength band of light that should reach an imaging element disposed in the rear stage of the lens device 100. The second wavelength band B2 does not overlap with the first wavelength band B1. Hereinafter, a wavelength band (a range of 450 nm or more and less than 650 nm) between the first wavelength band B1 and the second wavelength band B2 will be referred to as a third wavelength band B3.

A wavelength band (a range of 350 nm or more and 1650 nm or less) in which the first wavelength band B1, the second wavelength band B2, and the third wavelength band B3 are combined is referred to as an overall wavelength band B0. The maximal value, the minimal value, the peak value, and the like of the transmittance, which will described below, will be described as values in the overall wavelength band B0.

In the transmittance characteristic C1 shown in FIG. 3, the transmittance in the overall wavelength band B0 is 70% or more. Therefore, the first member 11 and the second member 12 each transmit almost all light having a wavelength of 350 nm or more and do not transmit almost any light having a wavelength shorter than 350 nm.

In the transmittance characteristic C2 shown in FIG. 3, the transmittance has a value higher than a first threshold value (for example, 70%) in the first wavelength band B1 and has a maximal value of the transmittance in the first wavelength band B1. With this configuration, light in a case of curing the resin of the second layer 22 can be sufficiently transmitted through the antireflection layer, so that the time required to cure the resin of the second layer 22 can be shortened or the curing can be stably performed. The resin of the second layer 22 is cured by performing light irradiation from a first antireflection layer 11A side. The resin of the second layer 22 may be cured by performing light irradiation from a second antireflection layer 12A side.

In addition, the transmittance characteristic C2 has a minimal value of the transmittance in the third wavelength band B3. This configuration makes it easy to design the transmittance of the antireflection layer in the first wavelength band B1 and the transmittance of the antireflection layer in the second wavelength band B2. In particular, it is possible to set the average transmittance of the antireflection layer in the second wavelength band B2 to a high value.

Further, the transmittance characteristic C2 has a peak value (maximum value) of the transmittance in the second wavelength band B2. In other words, in the transmittance characteristic C2, the maximal value is smaller than the peak value. In addition, in the transmittance characteristic C2, the average transmittance in the second wavelength band B2 is higher than a fourth threshold value (for example, 98.5%, preferably 99%). Further, in the transmittance characteristic C2, the transmittance in the second wavelength band B2 is higher than the transmittance in the first wavelength band B1. These configurations make it possible to realize a lens capable of transmitting a large amount of light in the second wavelength band B2.

In the transmittance characteristic C2, the minimal value is preferably sufficiently smaller than the maximal value. Specifically, in the transmittance characteristic C2, the difference between the minimal value and the maximal value is preferably 35% or more, more preferably 50% or more, and still more preferably 60% or more. In addition, in the transmittance characteristic C2, the maximal value is preferably equal to or more than 1.3 times the minimal value, more preferably equal to or more than 2 times the minimal value, and still more preferably equal to or more than 3 times the minimal value. In this way, by increasing the difference between the maximal value and the minimal value in the transmittance characteristic C2, it becomes easy to design the transmittance of the antireflection layer in each of the first wavelength band B1 and the second wavelength band B2, and it is possible to easily realize an antireflection layer having a desired transmittance.

The transmittance characteristic C3 shown in FIG. 3 has a value higher than a second threshold value (for example, 50%) as the maximum transmittance in the first wavelength band B1. With this configuration, light in a case of curing the resin of the second layer 22 of the optical layer 13 can be sufficiently transmitted through the first layer 21. Therefore, the time required to cure the resin of the optical layer 13 can be shortened, and the curing can be stably performed.

In addition, the transmittance characteristic C3 has the minimal value (=about 594 nm) of the transmittance on the long wavelength side of the third wavelength band B3 and has the maximal value and the peak value (maximum value) of the transmittance in the second wavelength band B2. This configuration makes it easy to control the refractive index of the optical layer 13 on the long wavelength side with respect to the minimal value. As a result, in particular, it is possible to set the average transmittance and the average diffraction efficiency of the optical layer 13 in the second wavelength band B2 to high values.

In addition, in the third wavelength band B3, the transmittance characteristic C3 has the minimal value at a wavelength on the short wavelength side by about 50 nm from an end part (650 nm) of the third wavelength band B3 on the long wavelength side and has the minimal value at a wavelength on the long wavelength side by about 150 nm from an end part (450 nm) of the third wavelength band B3 on the short wavelength side. As described above, the transmittance of the optical layer 13 changes steeply in the third wavelength band B3, so that it is possible to facilitate the design of the transmittance and the diffraction efficiency of the resin of the first layer 21 on the long wavelength side with respect to the minimal value.

Further, in the transmittance characteristic C3, in the second wavelength band B2, the average transmittance in terms of 10 μm is higher than a third threshold value (for example, 40%), and the average value of slopes of tangent lines of the graph is in a range from a first slope threshold value TH2 (for example, −0.08%/nm) to a second slope threshold value TH3 (for example, −0.03%/nm). As described above, the transmittance of the optical layer 13 has a peak on the short wavelength side in the second wavelength band B2 and gradually decreases from there toward the long wavelength side. With this configuration, the average transmittance of the optical layer 13 in the second wavelength band B2 can be easily increased.

As shown in FIG. 3, it is preferable that the minimal value of the transmittance of the antireflection layer is on the short wavelength side with respect to the minimal value of the transmittance of the first layer 21. With such a configuration, it is possible to facilitate the design of each of the antireflection layer and the optical layer 13.

The difference between the minimal value of the transmittance of the antireflection layer and the minimal value of the transmittance of the first layer 21 is preferably 50 nm or more and 150 nm or less. With such a configuration, it is possible to facilitate the design of each of the antireflection layer and the optical layer 13. In addition, as shown in the transmittance characteristic C4 of FIG. 4, the transmittance can be reduced on the short wavelength side with respect to the wavelength band used for imaging, and the width of the wavelength band in which the transmittance increases can be narrowed.

As shown in FIG. 4, the transmittance characteristic C4 of the lens 10 has a first maximal value (about 33%) of the transmittance on the short wavelength side, has a second maximal value (about 87%) of the transmittance on the long wavelength side, and has a minimal value (about 0%) of the transmittance between the first maximal value and the second maximal value. In addition, in the transmittance characteristic C4, the average value of absolute values of slopes of tangent lines of the graph on the long wavelength side with respect to a wavelength at which the second maximal value is obtained is smaller than the average value of absolute values of slopes of tangent lines of the graph from the second maximal value to the minimal value. By setting the transmittance characteristic of each constituent element of the lens 10 to the transmittance characteristic shown in FIG. 3, it is possible to realize the lens 10 in which the transmittance steeply rises from the vicinity of 600 nm and the transmittance gradually decreases from the vicinity of 700 nm. In addition, it is possible to realize the lens 10 having a certain degree of transmittance in the vicinity of 450 nm. In addition, the difference between the maximal value and the minimal value on the short wavelength side in the transmittance characteristic C4 can be set to 20% or more.

The lens device 100 is configured to, because light having a wavelength in a range of 350 nm to 600 nm is not used for imaging, not transmit the light in this range as shown in the transmittance characteristic C5 through, for example, a filter or the like that absorbs light having a wavelength in this range and that is included in the optical system 2 or the optical system 3.

Figure 5:
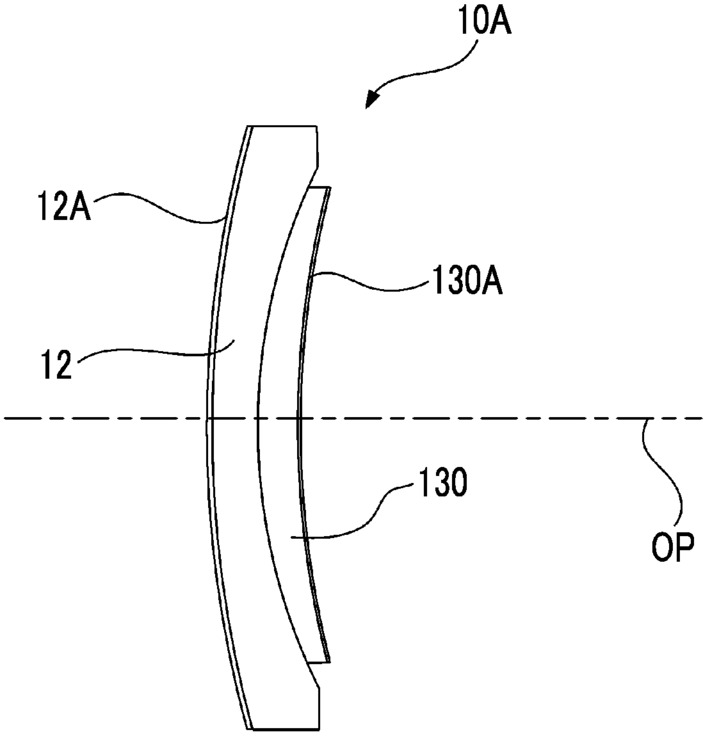
FIG. 5 is a schematic view of a cross-section of a lens 10A which is a modification example of the lens 10.

FIG. 5 is a schematic view of a cross-section of a lens 10A which is a modification example of the lens 10. The lens 10A has a configuration in which the first member 11, the first antireflection layer 11A, and the optical layer 13 are deleted from the lens 10, and instead, an optical layer 130 having a concave lens shape and an antireflection layer 130A are added thereto. The optical layer 130 contains a resin, and the transmittance characteristic thereof is preferably the same as the transmittance characteristic C3 in FIG. 3. It is preferable that the antireflection layer 130A is formed on a surface of the optical layer 130 opposite to the second member 12 side, and the transmittance characteristic thereof is the same as the transmittance characteristic C2 in FIG. 3.

Even in the case of the lens 10A shown in FIG. 5, similarly to the lens 10, it is possible to facilitate the design of the second antireflection layer 12A, the antireflection layer 130A, and the optical layer 130, and it is possible to easily realize a lens having a high transmittance in a wide range on the long wavelength side.

Hereinafter, a verification example of the lens 10 having the structure shown in FIG. 2 will be described. In Examples, Comparative Examples, and Reference Example shown below, the lens 10 having the structure shown in FIG. 2 was produced using the first member 11 and the second member 12 having the transmittance characteristic C1 shown in FIG. 3.

EXAMPLE 1

As the first antireflection layer 11A, a coating A2 was produced by setting the maximal value of the transmittance in the first wavelength band B1 to 90% and the minimal value of the transmittance in the third wavelength band B3 to 47% in the transmittance characteristic C2 shown in FIG. 3.

As the second antireflection layer 12A, a coating A1 was produced by setting the maximal value of the transmittance in the first wavelength band B1 to 99% and the minimal value of the transmittance in the third wavelength band B3 to 31% in the transmittance characteristic C2 shown in FIG. 3.

The optical layer 13 was produced to have a minimal value of 594 nm in the transmittance characteristic C3 shown in FIG. 3. The optical layer 13 can have the minimal value of the transmittance by containing an organic coloring agent therein.

The resin of the second layer 22 of the optical layer 13 was cured by performing light irradiation from the first antireflection layer 11A side.

EXAMPLE 2

The lens 10 was produced by changing the second antireflection layer 12A from the coating A1 to a coating A3 in Example 1. The coating A3 was produced by setting the maximal value of the transmittance in the first wavelength band B1 to 95% and the minimal value of the transmittance in the third wavelength band B3 to 36% in the transmittance characteristic C2 shown in FIG. 3.

EXAMPLE 3

The lens 10 was produced by changing the first antireflection layer 11A from the coating A2 to a coating A1 in Example 1.

COMPARATIVE EXAMPLE 1

The lens 10 was produced by changing the first antireflection layer 11A from the coating A2 to a coating A4 in Example 1. The coating A4 was produced by setting the maximal value of the transmittance in the first wavelength band B1 to 62% and the minimal value of the transmittance in the third wavelength band B3 to 30% in the transmittance characteristic C2 shown in FIG. 3.

COMPARATIVE EXAMPLE 2

The lens 10 was produced by changing the second antireflection layer 12A from the coating A1 to a coating A5 in Example 1. The coating A5 was produced by setting the maximal value of the transmittance in the first wavelength band B1 to 56% and the minimal value of the transmittance in the third wavelength band B3 to 25% in the transmittance characteristic C2 shown in FIG. 3. The resin of the second layer 22 of the optical layer 13 was cured by performing light irradiation from the second antireflection layer 12A side.

COMPARATIVE EXAMPLE 3

The lens 10 was produced by changing the first antireflection layer 11A from the coating A2 to a coating A6 and changing the second antireflection layer 12A from the coating A1 to the coating A6 in Example 1. The coating A6 was produced to have a transmittance characteristic having no minimal value in the overall wavelength band B0. The coating A6 was produced by setting the maximal value of the transmittance in the first wavelength band B1 to 91% and the minimal value of the transmittance in the third wavelength band B3 to 87%.

REFERENCE EXAMPLE

The lens 10 is produced by removing the organic coloring agent from the optical layer 13 in Example 1. Since the optical layer 13 in the lens 10 of Reference Example does not contain an organic coloring agent, the optical layer 13 has a transmittance characteristic that does not have a minimal value in the overall wavelength band B0.

Each of the lenses 10 of Examples 1 to 3, Reference Example, and Comparative Examples 1 to 3 was evaluated with three items. A first evaluation item is production suitability. In the first evaluation item, a case where the time required to manufacture the lens 10 (synonymous with the time required to cure the resin of the optical layer 13) is equal to or less than an allowable value was classified as "A (suitable for production)", and a case where the time required to manufacture the lens 10 exceeds the allowable value was classified as "B (unsuitable for production)".

A second evaluation item is the average transmittance in the second wavelength band B2 of the produced lens 10. In the second evaluation item, a case where the average transmittance is 30% or more, which does not cause any practical problem, was classified as "A (passing product)", and a case where the average transmittance is less than 30% was classified as "B (non-passing product)".

A third evaluation item is the average diffraction efficiency of the optical layer 13 of the produced lens 10 in the second wavelength band B2. In the third evaluation item, a case where a lower limit value of the average diffraction efficiency is 90%, which does not cause any practical problem, was classified as "A (passing product)", and a case where the lower limit value is 70% was classified as "B (non-passing product)".

FIG. 6 is a diagram showing evaluation results of Examples, Reference Example, and Comparative Examples. As can be seen from the results of Examples 1 to 3, Reference Example, and Comparative Example 1 to 3, it has been demonstrated that, by configuring the transmittance characteristic of the antireflection layer to have the maximal value and the minimal value (a value at which the difference between the two is 35% or more) from the short wavelength side, it is possible to ensure good production suitability while increasing the average transmittance of the entire lens in the second wavelength band B2. In addition, as can be seen from the results of Examples 1 to 3 and Reference Example, it has been demonstrated that, by configuring the transmittance characteristic of the optical layer 13 to have the maximal value and the minimal value from the short wavelength side, it is possible to increase the average diffraction efficiency of the optical layer 13 in the second wavelength band B2.

EXPLANATION OF REFERENCES

1, 2, 3: optical system
100: lens device
C1, C2, C3, C4, C5: transmittance characteristic
B1: first wavelength band
B2: second wavelength band
B3: third wavelength band
10A, 10: lens
11A: first antireflection layer
130A: antireflection layer
11: first member
12A: second antireflection layer
12: second member
13,130: optical layer
21: first layer
22: second layer

What is claimed is:

1. A lens comprising:
an optical layer containing a resin;
a member; and
an antireflection layer,
wherein the antireflection layer is provided at an outermost surface, in an optical axis direction, of the lens, and
a transmittance of the antireflection layer has a maximal value and a minimal value in order from a short wavelength side of a wavelength of light,
wherein a wavelength band of light is defined as a first wavelength band, a second wavelength band that does not overlap with the first wavelength band, and a third wavelength band between the first wavelength band and the second wavelength band, and
the transmittance of the antireflection layer has the minimal value in the third wavelength band and has the maximal value in the first wavelength band,
wherein a transmittance of the optical layer has a minimal value in the third wavelength band.

2. The lens according to claim 1,
wherein a difference between the maximal value and the minimal value is 35% or more.

3. The lens according to claim 1,
wherein the maximal value is equal to or more than 1.3 times the minimal value.

4. The lens according to claim 1,
wherein a difference between the maximal value and the minimal value is 35% or more.

5. The lens according to claim 1,
wherein the first wavelength band partially overlaps with an ultraviolet region.

6. The lens according to claim 1,
wherein the transmittance of the antireflection layer has a peak value in the second wavelength band.

7. The lens according to claim 1,
wherein the transmittance of the optical layer has a maximal value at a wavelength in the third wavelength band which is nearer to the first wavelength band than a wavelength at which the transmittance of the optical layer has the minimal value is.

8. The lens according to claim 7,
wherein the transmittance of the optical layer has a peak value in the second wavelength band.

9. The lens according to claim 1, wherein the second wavelength band is at a longer wavelength side than the first wavelength band.

10. The lens according to claim 1, wherein the first wavelength band is a photosensitive wavelength band of a photopolymerization initiator contained in the resin of the optical layer.

11. The lens according to claim 1, wherein the third wavelength band is a wavelength band between a value on a longer wavelength side by 50 nm with respect to a minimal value of a transmittance of the optical layer and a value on a shorter wavelength side by 150 nm with respect to the minimal value of the transmittance of the optical layer.

12. The lens according to claim 1, wherein the minimal value of the transmittance of the antireflection layer is on a shorter wavelength side with respect to a minimal value of a transmittance of the optical layer in terms of a thickness of 10 μm.

13. The lens according to claim 12, wherein a difference between the minimal value of the transmittance of the antireflection layer and the minimal value of the transmittance of the optical layer in terms of a thickness of 10 μm is 50 nm or more and 150 nm or less.

14. The lens according to claim 1, wherein the first wavelength band, the second wavelength band, and the third wavelength band are included in a range of 350 nm or more.

15. The lens according to claim 14, wherein the first wavelength band is in a range of 350 nm or more and less than 450 nm.

16. The lens according to claim 14, wherein the third wavelength band is in a range of 450 nm or more and less than 650 nm.

17. The lens according to claim 14, wherein the second wavelength band is in a range of 650 nm or more and less than 1650 nm.

18. The lens according to claim 1, wherein a diffraction grating is formed on the optical layer.

19. The lens according to claim 1, wherein the member includes a first member and a second member, and the optical layer includes a first layer and a second layer.

20. The lens according to claim 19, wherein the first member, the first layer, the second layer, and the second member are laminated in this order, and the antireflection layer is provided on the first member at a side opposite to the first layer and on the second member at a side opposite to the second layer.

21. The lens according to claim 20, wherein a diffraction grating is formed at an interface between the first layer and the second layer.

22. A lens device comprising: the lens according to claim 1.

23. A lens comprising:
an optical layer containing a resin;
a member; and
an antireflection layer,
wherein the antireflection layer is provided at an outermost surface, in an optical axis direction, of the lens,
a minimal value of a transmittance of the antireflection layer is on a shorter wavelength side with respect to a minimal value of a transmittance of the optical layer, and
a difference between the minimal value of the transmittance of the antireflection layer and the minimal value of the transmittance of the optical layer is 50 nm or more and 150 nm or less,
wherein a wavelength band of light is defined as a first wavelength band, a second wavelength band that does not overlap with the first wavelength band, and a third wavelength band between the first wavelength band and the second wavelength band,
the minimal value of transmittance of the antireflection layer is in the third wavelength band and has the maximal value in the first wavelength band, and
the minimal value of the transmittance of the optical layer is in the third wavelength band.

24. A lens comprising:
an optical layer containing a resin;
a member; and
an antireflection layer,
wherein the antireflection layer is provided at an outermost surface, in an optical axis direction, of the lens,
a transmittance of the lens has a first maximal value on a shorter wavelength side, the transmittance of the lens has a second maximal value on a longer wavelength side,
the transmittance of the lens has a minimal value between the first maximal value and the second maximal value, and
in a graph showing wavelength dependence of a transmittance of light, an average value of absolute values of slopes of tangent lines of the graph on a longer wavelength side with respect to a wavelength at which the second maximal value is obtained is smaller than an average value of absolute values of slopes of tangent lines of the graph from the second maximal value to the minimal value,
wherein a wavelength band of light is defined as a first wavelength band, a second wavelength band that does not overlap with the first wavelength band, and a third wavelength band between the first wavelength band and the second wavelength band,
a transmittance of the antireflection layer has the minimal value in the third wavelength band and has the maximal value in the first wavelength band, and
a transmittance of the optical layer has a minimal value in the third wavelength band.

25. The lens according to claim 24, wherein a difference between the first maximal value and the minimal value is 20% or more.

* * * * *